March 3, 1936.  J. R. COE  2,032,685

METHOD OF FORMING A COMPOSITE TUBE

Filed Dec. 28, 1933  2 Sheets-Sheet 1

INVENTOR
James R. Coe
BY
Wooster & Davis
ATTORNEYS.

Patented Mar. 3, 1936

2,032,685

UNITED STATES PATENT OFFICE 2,032,685

METHOD OF FORMING A COMPOSITE TUBE

James R. Coe, Watertown, Conn., assignor to The American Brass Company, Waterbury, Conn., a corporation of Connecticut Application December 28, 1933, Serial No. 704,231

6 Claims. (Cl. 29—188)

This invention relates to new and useful improvements in method of and equipment for forming a composite tube.

An object of the invention is to provide a simple, efficient and economical method of intimately bonding together, while maintaining the desired proportions between them, the inner and outer shells of a comparatively heavy walled composite tube.

Another object is to provide a simple and inexpensive, yet highly efficient means for carrying out said method.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

Figure 1:
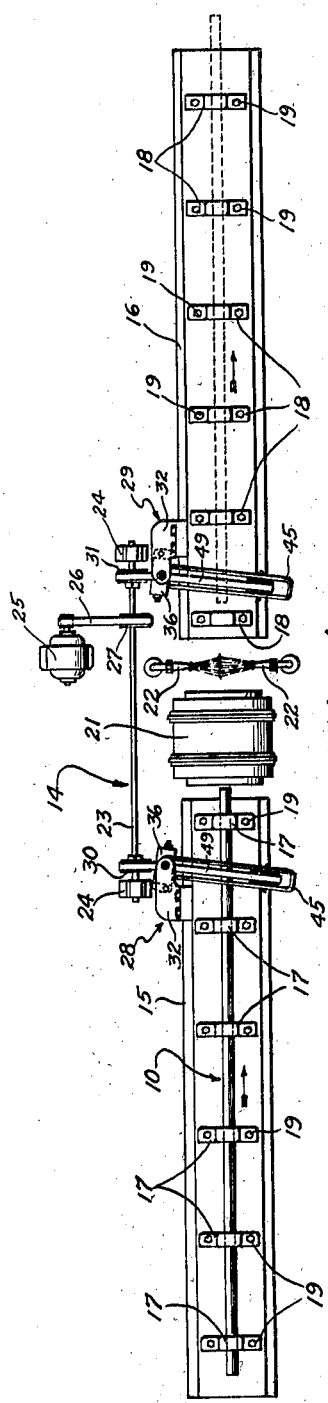
Fig. 1 is a plan view illustrating a means or equipment constructed according to the present invention but shown somewhat diagrammatically.

There is now a considerable and growing demand for composite tubes comprising an outer shell of more or less refractory metal having a high melting point such for example as steel or copper and a lining or inner shell of soft metal having a comparatively low melting point such for example as lead, tin or zinc, the inner shell being of greater thickness than can reasonably be obtained by ordinary coating methods such as plating or galvanizing. A comparatively heavy walled composite tube will retain the original proportions between its inner and outer shells when the tube is subjected to drawing or other reducing operations if the two shells are intimately bonded together.

The present invention provides a simple, efficient and economical means and method of intimately bonding together the inner and outer shells of a composite tube. In the drawings a composite tube 10 is illustrated as comprising (see particularly Fig. 3) a soft metal shell or tube 11 located within a shell or tube 12 of relatively hard or more refractory metal. Shell 11 is somewhat shorter than shell 12 and the latter at its ends receives closely fitting annular plugs 13 of any refractory material having a higher melting point than the metal of the inner shell 11. These plugs may be of metal or any other suitable material having a higher melting point than the inner shell 11.

This composite tube is ready for treatment in accordance with the teaching of the present invention. In order that a better and more uniform bond may be obtained between the inner and outer shells it is preferred to treat the inner surface of the outer shell with acid or other fluxing material before placing the inner shell within the outer shell. This step should be taken since the soft inner shell will adhere more readily to the clean inner surface of the outer shell when the tube is treated as will be described. However, here it should be understood that the inner shell has a snug or tight fit within the outer shell.

Composite tube 10 having been prepared as described it is passed through the means or equipment generally designated 14 and by which it is treated as will now be described to establish an intimate bond between its inner and outer shells so that it may later be drawn or passed through other reducing operations without changing the proportionate thicknesses of its respective shells.

The present means 14 for treating the tube 10 includes similar benches or platforms 15 and 16 arranged in alignment but with their adjacent ends spaced apart and each mounting a series of pedestals of which those on the bench 15 are designated 17 while those on the bench 16 are designated 18. These pedestals may be bolted to the benches as best indicated at 19 in Fig. 4 and the pedestals are arranged in alignment and each includes a bearing 20 of any suitable construction although it is preferred that the bearings include suitable ball or roller anti-friction means as shown.

Between the benches 15 and 16 is arranged a furnace 21 which may be of any suitable kind or type heated by gas, coal, oil or electricity as desired. Furnace 21 has a passage therethrough and through which a tube 10 may be fed. That is, the tube 10 may be fed through the bearings of pedestals 17 and through the furnace 21 to the bearings of the pedestals 18. Arranged between the furnace 21 and the bench 16 is suitable spray means 22 designed to cool a tube as it is fed from the furnace to the bearing pedestals 18.

At one side of the furnace is mounted a shaft 23 which shaft in the drawings is shown as mounted by bearings 24 disposed on the floor. A motor 25 such as an electric motor drives the shaft 23 through a belt 26 driven by the motor and trained over a pulley 27 on the shaft. The shaft 23 operates a pair of similar tube rotating and feeding means generally designated 28 and 29 and operating respectively to feed a tube 10 through the bearing pedestals 17 and the furnace and from the furnace through the bearing pedestals 18. The means 28 and 29 are driven by pulleys 30 and 31 respectively mounted on the shaft 23 to be driven thereby.

Each of the tube rotating and feeding means includes a suitable bracket 32 bolted or otherwise secured to its bench as at 33 and which bracket includes upper and lower arms 34 and 35 between which is located, and by which is mounted, pulley supporting means including a frame 36. Said frame is mounted for turning movement about an upright axis as on the inner reduced end portions 37 of studs 38 threaded through the arms 34 and 35 of the bracket and obviously the frame is capable of a turning or pivotal movement relative to the bracket. As will later be apparent, any desired means may be provided for securing the frame 36 in the desired position of adjustment and as here disclosed the frame includes a projecting portion or lip 39 against which may be tightened a screw or bolt 40 threaded through the arm 34 of the bracket. On tightening of the screw 40 the same will clamp against the lip 39 and secure the frame 36 and parts carried thereby in adjusted position, or the screw may be left loosened and the frame held at the proper location and angle by the operator.

A pair of shafts 41 and 42 are mounted by the frame 36 and these shafts carry idler pulleys 43 and 44 respectively. Also, carried by frame 36 is a horizontally disposed substantially U-shaped member 45 the inner ends 46 of which may be supported on the shaft 41 and located one on each side of the pulley 43 of said shaft as shown. Between the arms of member 45 extends a shaft 47 mounting an idler pulley 48. Here it is noted that the pulley 44 is located in a plane below the plane of the pulleys 43 and 48. A relatively long endless belt 49 is trained over the pulley 30 and the pulleys 43 and 48 and has its lower side operating against the idler pulley 44. The pulley 30 operates to drive the belt 49 in the direction indicated by the arrow 50 in Fig. 4 and it will be noted the lower side of said belt runs against the upper surface of the tube 10 supported in the bearing pedestals on the benches.

Figure 2:
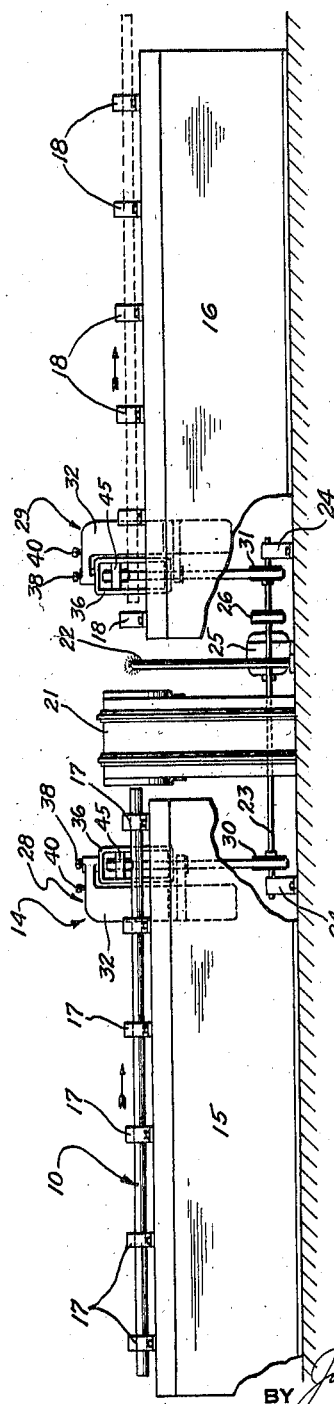
Fig. 2 is a side elevational view of the means of Fig. 1, the view being taken as when looking from the lower side of Fig. 1.
Figures 3, 4, 5, 6:
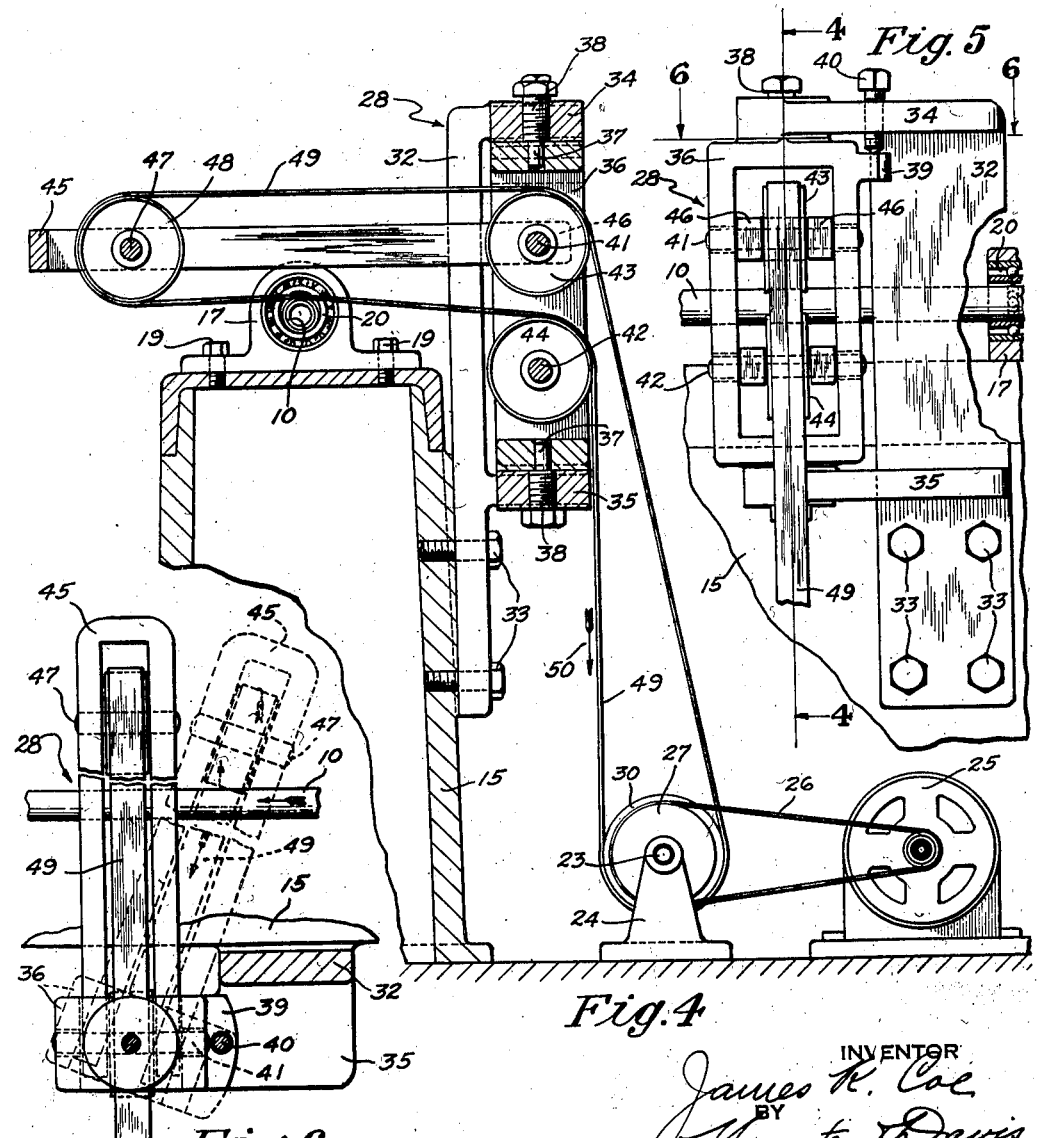
Fig. 3 is a longitudinal sectional view through a composite tube prepared in accordance with the present invention for further treatment.
Fig. 4 is a transverse sectional view on an enlarged scale and showing the tube feeding means, the view being taken substantially along the plane of the line 4—4 of Fig. 5.
Fig. 5 is a side elevational view illustrating certain details of the tube feeding means looking from the right of Fig. 4.
Fig. 6 is a view partly in top plan and partly in section, the view being taken substantially along the plane of line 6—6 of Fig. 5, and showing other details of the tube feeding means.

As the belt 49 is driven it serves to rotate the tube 10 and feed the same longitudinally. The tube 10 to the left in Figs. 1 and 2 is fed toward the right or in the direction indicated by arrows in that figure and the rate of rotation of the tube depends on the speed with which the belt 49 is driven. In order that the belt may feed the tube in the direction of the length of the latter the belt must engage the tube at and incline with respect to a line drawn perpendicular to the axis of the tube. As clearly shown in Fig. 1 the belts of the driving or feeding means 28 and 29 are arranged at a slight angle or incline with respect to a line drawn perpendicular to the longitudinal axis of the tube. Fig. 6 suggests on an enlarged scale the manner in which the relation of the belt to the tube may be adjusted. As above stated the member 45 is carried by the frame 36 and the latter is turnable on the pivots 37 for adjustment and may be secured in adjusted position by the screw 40. To increase the speed at which the tube is fed in the direction of its length it is but necessary to loosen the screw 40 and turn the frame 36 and parts carried thereby so as to dispose the member 45 and the belt at a greater incline with respect to a position normal to the longitudinal axis of the tube. Conversely, as the parts are adjusted to dispose the belt more nearly normal or perpendicular to the longitudinal axis of the tube the speed with which the tube is fed longitudinally will be decreased. After the desired adjustment has been made the screw 40 may be tightened to secure the parts in position.

When the tube 10 is made up as described above and as shown in Fig. 3 the shell 11 has a snug or tight fit within the shell 12 and is also held against lengthwise movement therein by the annular plugs 13. It will be noted that both shells have comparatively heavy walls and the proportionate thicknesses of the walls may be maintained when the tube is subjected to a drawing or other reducing operations provided the two shells are intimately bonded together. To accomplish this desired bonding together of the shells 11 and 12 the tube 10 is disposed within the bearing pedestals 17 as clearly shown in Figs. 1 and 2 and fed through the furnace 21. It is noted that a portion of the tube is beneath the lower side of the belt 49 of the tube rotating and feeding means 28.

Now, assuming that the furnace 21 is in operation and that the belt 49 is being driven the latter will serve to rotate the tube 10 in the bearings of pedestals 17 and to feed the tube in the direction of its length. Thus, the tube is fed into and through the furnace 21 and the tube is progressively heated as it is fed and rotated the heating commencing at the forward end of the tube as soon as such end enters the furnace. As the tube emerges from the furnace it is engaged by the spray of means 22 whereby it is cooled and thereafter enters the bearing of the first pedestal 18 on bench 16. Attention is directed to the fact that the tube 10 is of greater length than the distance between the feeding means 28 and 29 and the feeding means 28 will continue to feed the tube in the direction of its length for a considerable period of time after the feeding means 29 has engaged the tube and that the feeding means 29 will continue to feed the tube along and draw its rear end portion through the furnace and cooling spray after such end of the tube has left the feeding means 28.

As the tube is fed through the furnace the tube is, of course, heated progressively from end to end. The heat applied is such with relation to the speed of the feed of the tube that the inner shell or the outer portion of such shell is softened or melted progressively as the tube moves through the furnace. Centrifugal force due to rotation of the tube will act to hold the melted portion of the inner shell in exact position circumferentially while at the ends of the tube the plugs 13 will hold the melted portions of the inner shell in exact position longitudinally and will be assisted by the adjoining solid portions of the shell. As the intermediate portions of the tube are heated the melted portions of the inner shell are held in place longitudinally by the adjacent solid portions of such shell. From this, it will be understood that by progressive heating of the tube is meant that the portion of the tube to which heat is being applied is constantly changing as the tube is fed through the furnace so that but a short section or portion of the inner shell is melted at any one time, and this is held in exact position longitudinally by the adjacent solid portions of the shell during the sealing or bonding operation.

It will be understood that as the tube is fed from the furnace it cools and the melted portion of the inner shell will harden, and that the tube will pass to the feeding means 29 and the pedestal bearings 18 in a relatively cool condition. As the melted portions of the inner shell harden in contact with the inner surface of the outer shell, which preferably has been treated with acid or other fluxing material, the two shells are intimately bonded together over their entire adjoining surfaces. Since this is the case, the composite tube may be drawn or otherwise treated to reduce it and the relative wall thicknesses of the inner and outer shells will remain the same. The method of treating the tube to intimately bond together its inner and outer shells is simple and expeditious and is taken care of practically automatically by the equipment disclosed. The speed at which the tube is fed will depend to some extent on the melting point of the material of the inner tube and will also depend upon the heating capacity of the furnace.

As above pointed out the speed with which the tube is fed may be varied by adjusting the angle of incline at which the belt engages the tube and the tube is rotated at a speed dependent on the speed of the belt. The method is substantially automatic once the tube has been assembled as best disclosed in Fig. 3, and it is but necessary to position the tube in the bearing pedestals 17 as disclosed in Figs. 1 and 2 the tube then being automatically fed to and through the furnace and its inner and outer shells intimately bonded together. The treated tube is automatically disposed in a cooled state in the pedestal bearings 18 from which it may be removed either manually or by any suitable means.

Having thus set forth the nature of my invention, what I claim is:

1. The method of bonding together the inner and outer shells of a comparatively heavy walled composite tube of which the inner shell has a lower melting point than the outer shell, the same comprising progressively heating relatively small portions of said composite tube to progressively melt the outer portion only of the inner shell thereof without melting the outer shell, and immediately progressively cooling the heated portions of the tube to harden the melted portions of the inner shell in contact with the outer shell.

2. The method of bonding together the inner and outer shells of a comparatively heavy walled composite tube of which the inner shell has a lower melting point than the outer shell, the same comprising progressively heating relatively small portions of said composite tube to progressively melt the outer portion only of the inner shell thereof without melting the outer shell, rotating said tube while heating the same whereby to have the melted portions of the inner shell held in position circumferentially by centrifugal force, and immediately progressively cooling the heated portions of the tube while continuing such rotation to harden the melted portions of the inner shell in contact with the outer shell.

3. The method of bonding together the inner and outer shells of a comparatively heavy walled composite tube of which the inner shell has a lower melting point than the outer shell, the same comprising progressively heating relatively small portions of said composite tube to progressively melt the outer portion of the inner shell thereof without melting the outer shell, maintaining the melted portions of the inner shell against movement longitudinally of the tube, rotating said tube while heating the same whereby to have the melted portions of the inner shell held in position circumferentially by centrifugal force, and progressively cooling the heated portions of the tube while continuing such rotation to harden the melted portions of the inner shell in contact with the outer shell.

4. The method of bonding together the inner and outer shells of a comparatively heavy walled composite tube of which the inner shell has a lower melting point than the outer shell, the same comprising feeding the tube lengthwise through a furnace to progressively heat and melt relatively small portions of the outer portion only of the inner shell, and immediately progressively cooling said portions of the tube as they are fed from the furnace.

5. The method of bonding together the inner and outer shells of a comparatively heavy walled composite tube of which the inner shell has a lower melting point than the outer shell, the same comprising feeding the tube lengthwise through a furnace to progressively heat and melt relatively small portions of the outer portion of the inner shell, maintaining the melted portions of the inner shell against movement longitudinally of the tube, rotating the tube while heating and feeding the same whereby to have the melted portions of the inner shell held in position circumferentially by centrifugal force, and immediately progressively cooling said portions of the tube as they are fed from the furnace.

6. The method of bonding together the inner and outer shells of a comparatively heavy walled composite tube of which the inner shell has a lower melting point than the outer shell, the same comprising having the inner shell of less length than the outer shell, placing plugs in the ends of the outer shell in abutting relation with the ends of the inner shell, progressively heating relatively small portions of the tube to melt the outer portion of the inner shell, maintaining the melted portions of the inner shell against movement longitudinally of the tube by means of the plugs and solid portions of the said inner shell, rotating the tube while heating and feeding the same whereby to have the melted portions of the inner shell held in position circumferentially by centrifugal force, and immediately progressively cooling said portions of the tube.

JAMES R. COE.